United States Patent
MacDonald

(12) 
(10) Patent No.: US 6,480,644 B1
(45) Date of Patent: Nov. 12, 2002

(54) OPTICAL SWITCHING DEVICE

(75) Inventor: Robert I. MacDonald, Manotick (CA)

(73) Assignee: JDS Uniphase Inc., Ottawa (CA)

( * ) Notice: Subject to any disclaimer, the term of this patent is extended or adjusted under 35 U.S.C. 154(b) by 25 days.

(21) Appl. No.: 09/588,121

(22) Filed: Jun. 2, 2000

(30) Foreign Application Priority Data

Jun. 4, 1999 (CA) ............................................. 2273641

(51) Int. Cl.[7] ............................ G02B 6/26; G02B 6/42; G02B 6/00; H04J 14/06
(52) U.S. Cl. ............................ 385/16; 385/11; 359/122
(58) Field of Search ....................... 385/11, 16; 359/122

(56) References Cited

U.S. PATENT DOCUMENTS 4,661,699 A * 4/1987 Welmers et al. ............ 250/235
5,905,823 A * 5/1999 Shintaku et al. ............ 385/11

* cited by examiner

Primary Examiner—Akm E. Ullah
Assistant Examiner—Jerry T. Rahll
(74) Attorney, Agent, or Firm—Neil Teitelbaum

(57) ABSTRACT

An optical switching device for controlling an optical signal is disclosed. The optical switching device is in the form of an optical loop, the loop having two ports for launching or receiving light. A switching element is interposed within the loop for selectively launching light to one of the two ports. The switching element has a polarization rotating element for rotating the polarization of light incident thereon and a wavelength dependent filter disposed to bypass the polarization rotating element or direct a signal propagating within the loop through the polarization rotating element in dependence upon wavelength.

25 Claims, 8 Drawing Sheets

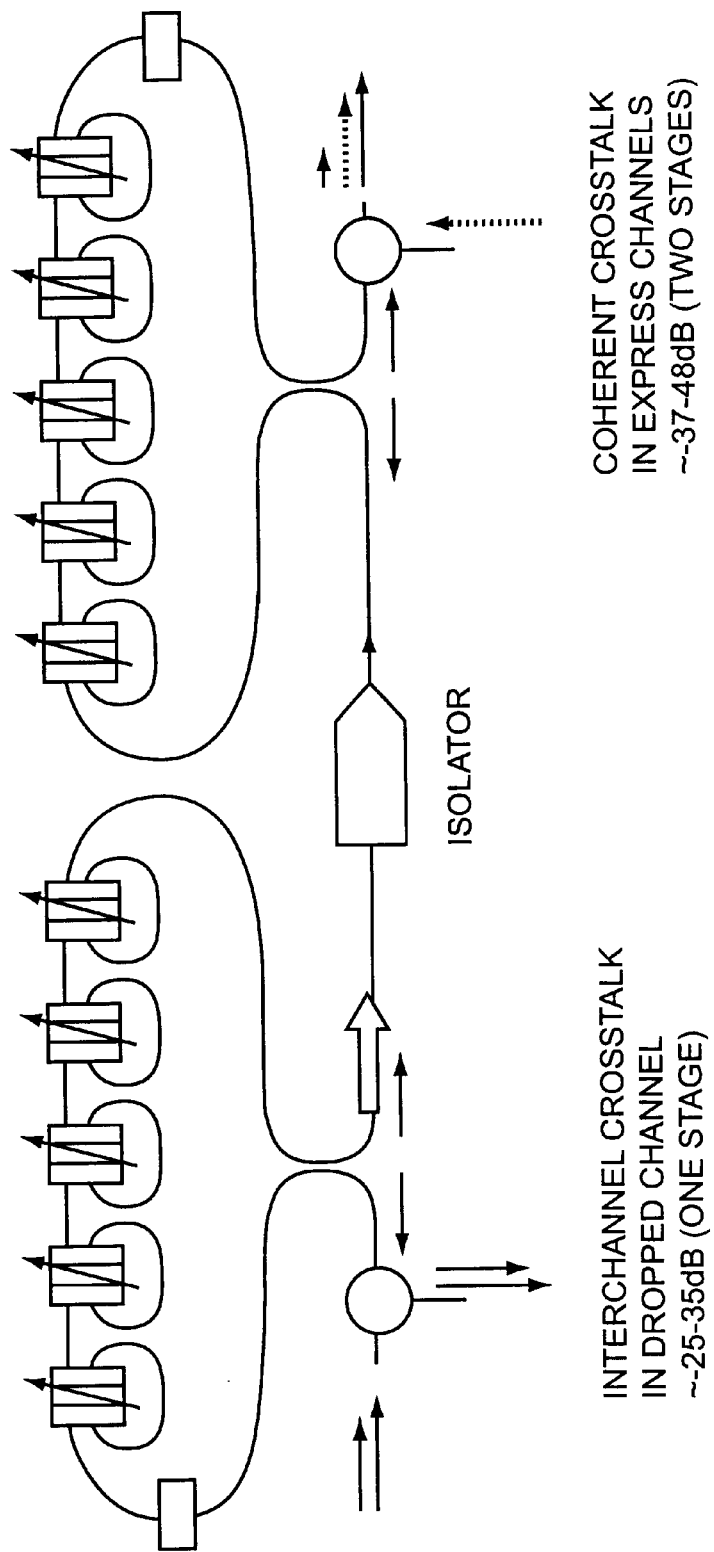

OPTICAL SWITCHING DEVICE

FIELD OF THE INVENTION

This invention relates to an optical switching device for switching an optical signal in a communications network, and in particular to an optical switching device using an optical loop.

BACKGROUND OF THE INVENTION

In evolving optical communication networks, the need often arises to switch an optical signal from one path to another, be it along a waveguide or in free space. For example, in a network, which consists of a number of communication nodes connected sequentially to form a ring, it may be required to temporarily remove one or more nodes from the network. Therefore the optical waveguides, for example in the form of optical fibers interconnecting the network must be able to "switch" the node(s) from an active (transmit/receive) state to a passive (bypass) state. Many arrangements exist in the art for providing this type of switching.

An exemplary optical fiber switch that utilizes a moving mirror to perform the switching function is disclosed by Levinson in U.S. Pat. No. 4,580,873 issued Apr. 8, 1986 which is incorporated herein by reference. Another switch of the former design is disclosed by Benzoni in U.S. Pat. 5,042,889 and assigned to AT&T Bell Laboratories and issued in 1991. Benzoni's invention relates to an activation mechanism for moving a reflective element in or out of the path of a beam of light, to allow light to be either transmitted in a first position or reflected in a second position. Both inventions rely on moving mechanical parts limiting the speed of switching and causing reliability problems. Furthermore, mechanical switches are too complex and too expensive to manufacture for use in large optical communication networks.

To overcome the inherent problems of mechanical switching optical switches relying on interferometric techniques have been developed. One such example is a Mach-Zehnder interferometer as disclosed by M. J. LaGrasse et al. in "Ultrafast Switching with a Single Fiber Interferometer", Optics Letters, Mar. 15, 1989, Vol. 14, No. 6, pp. 311–313. The Mach-Zehnder interferometer accepts a signal, splits it into two parts that are sent over two distinct paths, and recombines the signal of the two paths. Switching is achieved by including a phase shifting element in one of the two paths. Unfortunately, the two signal parts travel different paths, which do not occupy a same space. As a result, the constructive and destructive combination of the two signal parts at the output is subject to different temperatures, pressures, electric fields and other extraneous factors and cannot be reliably controlled.

Exemplary optical switches that utilize a Sagnac interferometer to perform the switching function are disclosed by Giabriel et al. in U.S. Pat. No. 5,144,375 issued Sep. 1, 1992, Blow et al. in U.S. Pat. No. 5,307,428 issued Apr. 26, 1994, and Blow et al. in U.S. Pat. No. 5,473,712 issued Dec. 5, 1995, which are incorporated herein by reference. Switching is activated by sending an optical pump pulse concurrently with the optical signal affecting the polarization of two signal portions travelling through the Sagnac interferometer. Use of optical pump pulses for reliably controlling optical switches is difficult to apply in large optical communication network where a plurality of switches is cascaded. Switching by sending an optical pump pulse is, furthermore, difficult to implement in wavelength division optical communication networks comprising a plurality of wavelength channels transmitted in one fiber.

It is an object of the invention to provide an optical switch for reliably switching an optical signal in a large optical communications network that is controlled at high speed using an electric signal.

It is further an object of the invention to provide an optical switch that is easily implemented in a wavelength division optical communication network.

SUMMARY OF THE INVENTION

In accordance with the invention there is provided, an optical switching device for controlling an optical signal. The switching device comprises: two ports disposed for optical communication therebetween for launching or receiving light;

a polarization rotating element interposed between the two ports for rotating the polarization of light incident thereon; and, a filtering element disposed to bypass the polarization rotating element or direct a signal propagating between the two ports through the polarization rotating element in dependence upon a property of the light.

In accordance with the invention there is provided, an optical switching device for controlling an optical signal. The switching device comprises: an optical loop, the loop having two ports for launching or receiving light; a switching element interposed within the loop for selectively routing light, the switching element comprising:

a polarization rotating element for rotating the polarization of light incident thereon; and, a filtering element disposed to bypass the polarization rotating element or direct a signal propagating within the loop through the polarization rotating element in dependence upon a property of the light.

In accordance with the invention there is further provided, a method for switching an optical signal. The method comprises the steps of: receiving an optical input signal from one of two ports; rotating the polarization of the optical input signal using a polarization rotating element interposed between the two ports; and, using a filtering element for bypassing the polarization rotating element or for directing a signal propagating between the two ports through the polarization rotating element in dependence upon a property of the light.

In accordance with another aspect of the invention there is provided, a transmultiplexer for interchanging optical signals between two optical fibers. The transmultiplexer comprises:

an optical loop, the loop having two ports wherein each port is connected to one of the two optical fibers for launching or receiving light; at least a switching element interposed within the loop for selectively routing light, the switching element comprising:

a polarization rotating element for rotating the polarization of light incident thereon; and, a filtering element disposed to bypass the polarization rotating element or direct a signal propagating within the loop through the polarization rotating element in dependence upon a property of the light.

BRIEF DESCRIPTION OF THE DRAWINGS

Exemplary embodiments of the invention will now be described in conjunction with the drawings, in which:

FIG. 1b is a detailed schematic diagram of a switching element shown generally in FIG. 1a;

FIG. 2b is a detailed schematic diagram of a switching element shown generally in FIG. 2a;

FIG. 3b is a detailed schematic diagram of a switching element shown generally in FIG. 3a;

FIG. 4c is a schematic diagram of another embodiment showing two transmultiplexers chained together; and, FIG. 5 is a schematic diagram of another embodiment of an optical switching device according to the invention comprising an optical loop.

DETAILED DESCRIPTION OF THE INVENTION

Figure 1A:
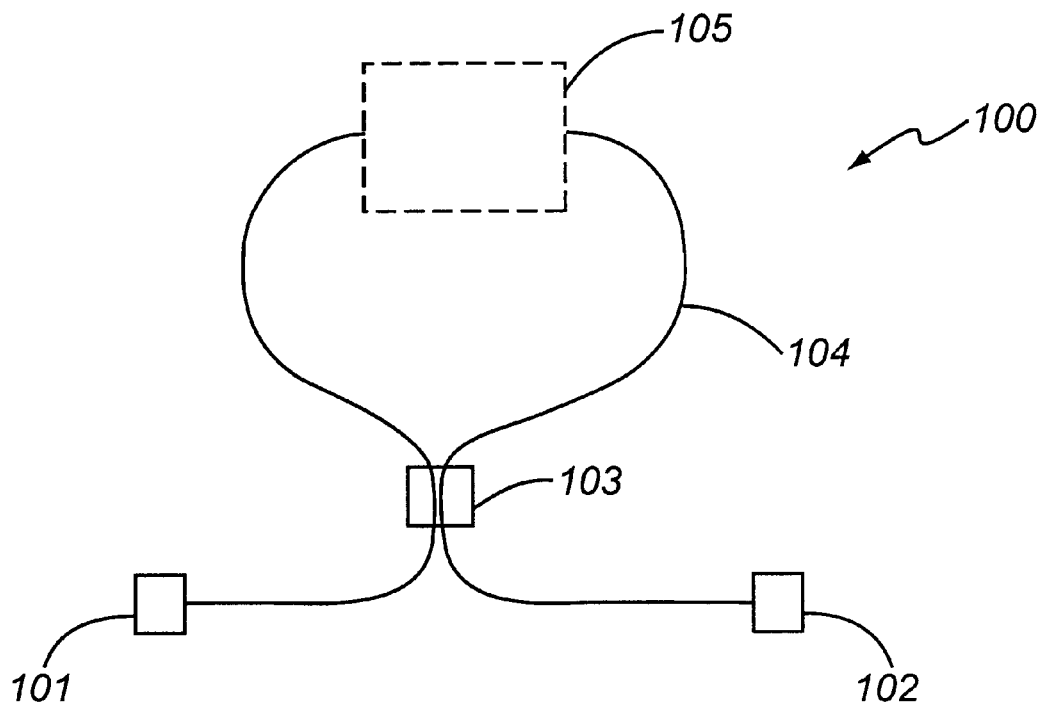
FIG. 1a is a schematic diagram of an optical switching device according to the invention comprising an optical loop.
Figure 1B:
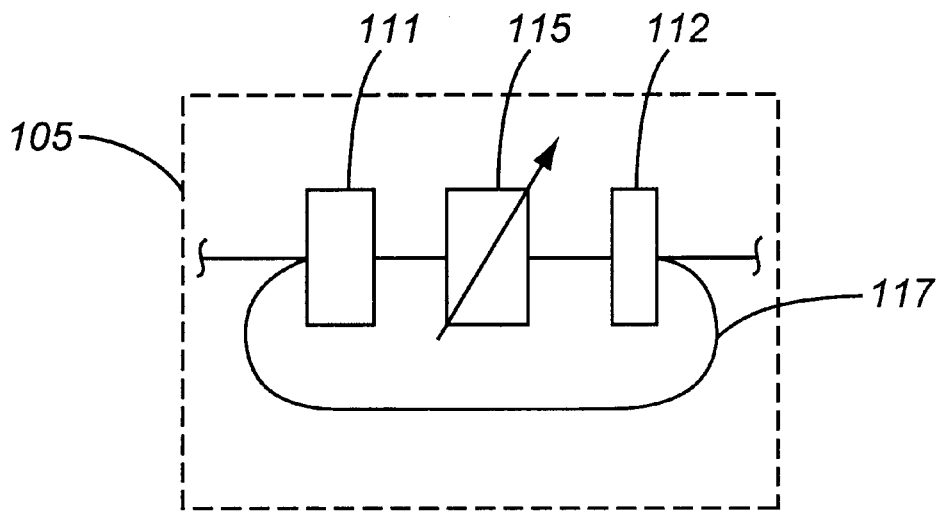

Referring to FIGS. 1a, b an optical switching device 100 according to the invention is shown. The optical switching device 100 comprises an optical loop 104 with a switching element 105 interposed in the loop 104 as indicated in FIGS. 1a,b by the dashed line. Preferably the optical loop 104 has a polarization maintaining property. The optical loop 104 has a loop mirror property; that is light of any wavelength received from one of the ports 101, 102 is reflected to the receiving port. Light received, for example, at the port 101 is split into two sub-beams or portions in the coupler 103. The two portions travel around the loop 104 in opposite directions and are then combined in the coupler 103. A power splitting coupler for splitting a light beam into two sub-beams of equal power is used for splitting and combining the optical signal. Alternatively, a polarization beam splitter and a rotator optically coupled with the polarization beam splitter may be used. In the case of the power splitting coupler, the loop mirror property of the optical loop 104 results from the phase change of π/2 that occurs for light crossing over the coupler 103 leads to opposite phases at the port 102 for light that traveled in opposite directions around the loop 104, resulting in a destructive combination of the two light portions. The two light portions leaving the receiving port 101 are added in phase. Interposing a switching element 105 according to the invention into the optical loop 104 allows to switch the loop mirror to a transmissive state, that is light is transmitted to the port 102. The switching element 105 comprises a polarization rotating element 115 such as a Faraday rotator for rotating the polarization of light travelling in an opposite direction through the polarization rotating element 115. Light travelling in opposite directions through the polarization rotating element 115 is rotated 90 degrees in opposite directions. Therefore, the interference alter combining the two light portions is reversed.

An example fur such an optical loop is a Sagnac interferometer, but any loop of fiber—preferably polarization maintaining fiber—may be used.

Using an optical loop and a Faraday rotator for switching an optical signal according to the invention provides a switching device that is always balanced, that is fiber length, stress, temperature, etc. have no adverse effect on switching. Furthermore, the Faraday rotator operates in saturation resulting in an accurate rotation of the polanzation, thus minimizing signal loss.

Another advantage of the switching device according to the invention is its simplicity resulting in inexpensive manufacture using commonly available parts and increased reliability by obviating moving parts such as mirrors.

Two filter elements 111 and 112 disposed on opposite sides of the polarization rotating element 115 allow to bypass the polarization rotating element 115 using fiber loop 117 or direct a signal propagating within the loop 104 through the polarization rotating element 115 in dependence upon a property of the light such as wavelength, intensity or shape of a light pulse. This enables selectively switching of a predetermined signal to the ongoing port, while other signals are reflected to the receiving port.

Such a switching device is highly advantageous for use in large optical communications networks comprising a plurality of wavelength channels transmitted in one fiber. For example, using wavelength dependent filters for passing one or more channels each having a predetermined centre wavelength and for reflecting one or more other channels having other centre wavelengths allows to selectively switch one or more channels using a same switching device. Furthermore, it obviates the need for demultiplexing a signal before switching.

Figure 2A:
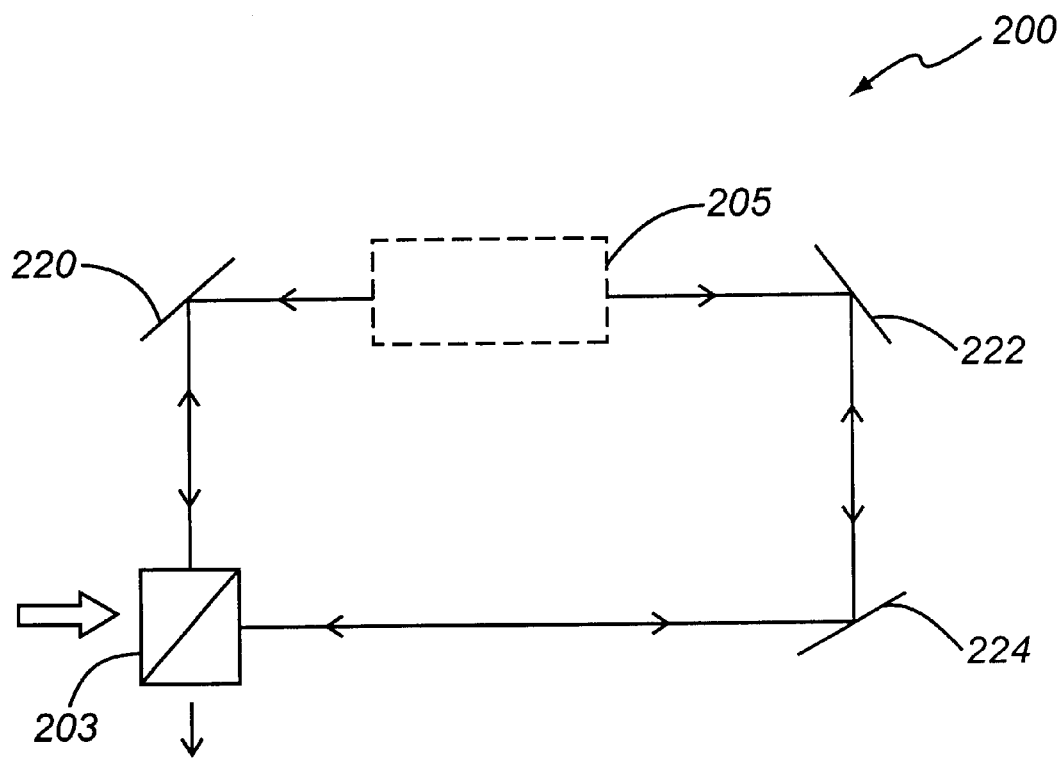
FIG. 2a is a schematic diagram of a free space version according to the invention of the optical switching device shown in FIG. 1.
Figure 2B:
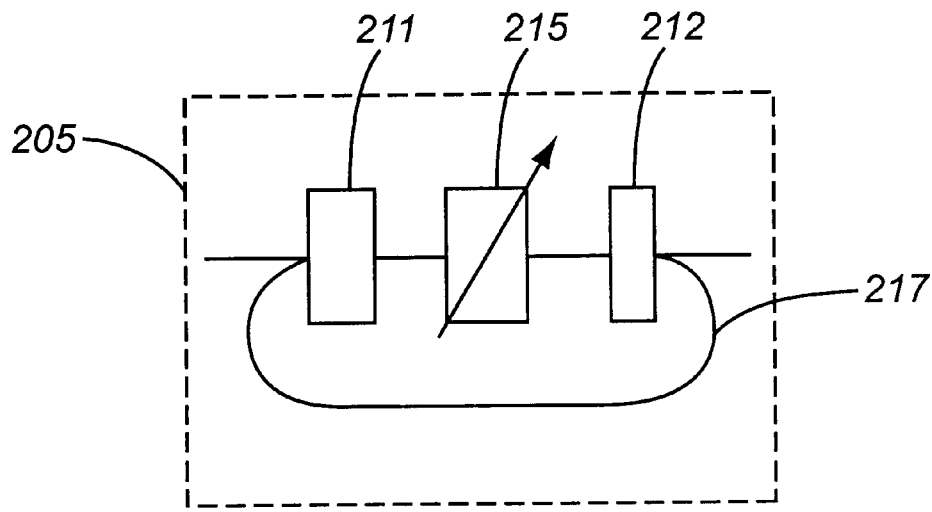
Figure 3A:
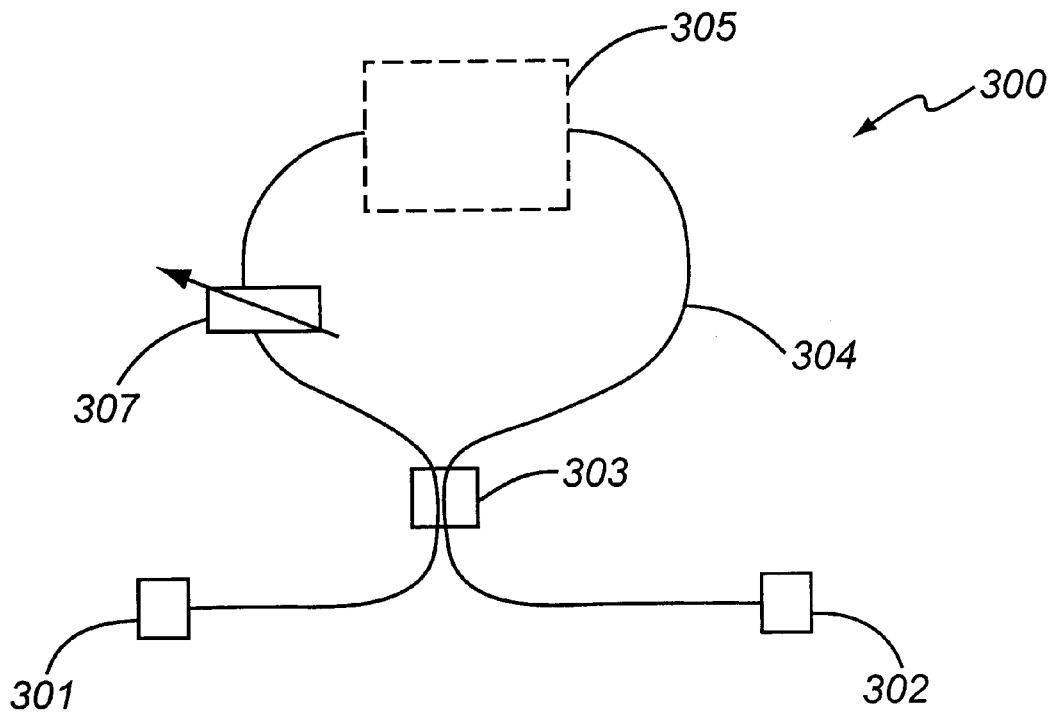
FIG. 3a is a schematic diagram of another embodiment of the optical switching device according to the invention.
Figure 3B:
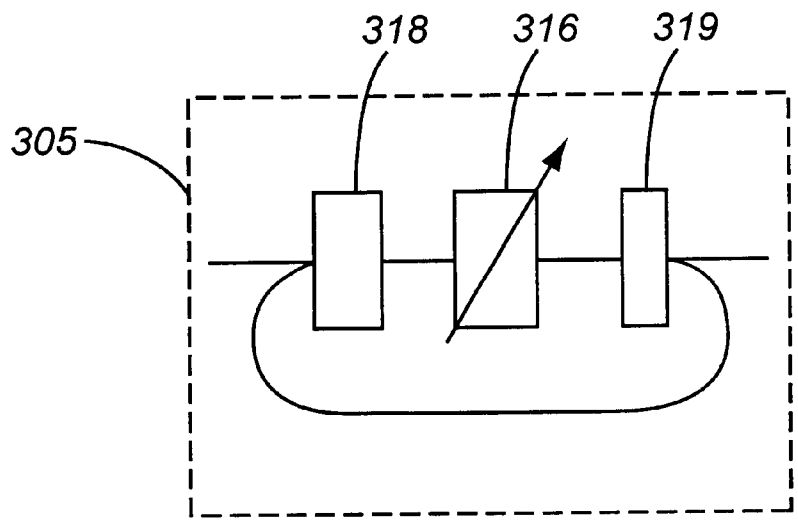
Figure 3C:
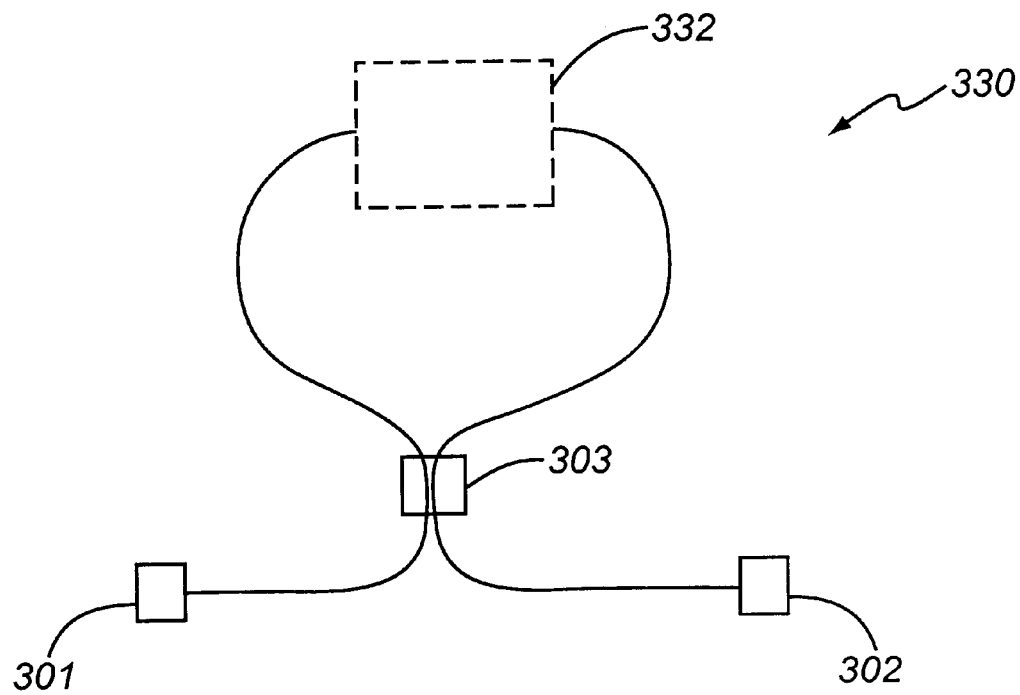
FIG. 3c is a schematic diagram of another embodiment of the optical switching device according to the invention.
Figure 3D:
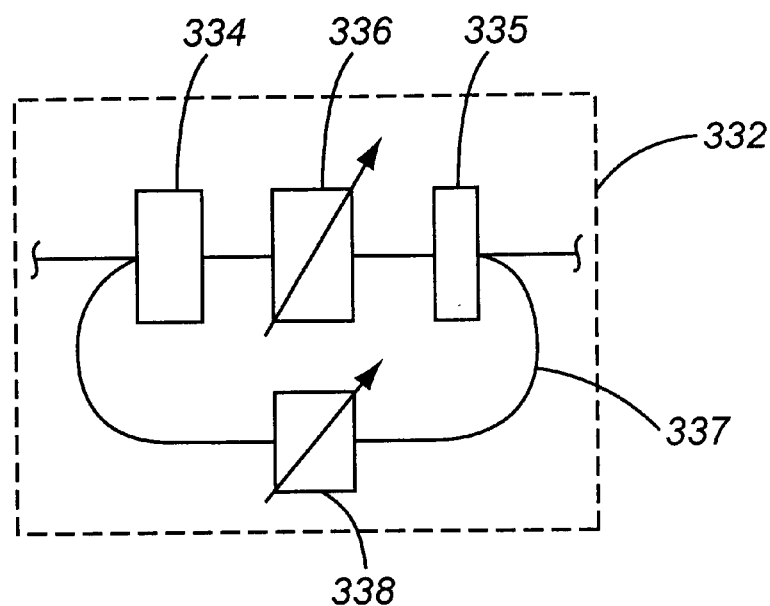
FIG. 3d is a detailed schematic diagram of a switching element shown generally in FIG. 3c.

FIGS. 2a, b show a free space version 200 of the switching device according to the invention. Here, the fiber loop 104 connected to the coupler 103 is replaced by three mirrors 220, 222 and 224 creating a "loop like" optical path to and from coupler 203. A switching element 205 is interposed in the optical path between the mirrors 220 and 222. Alternatively, the switching element may be located at any other location in the optical path between the coupler 203 and the mirrors 220, 222, and 224. The switching element 205 comprises a polarization rotating element 215, two filtering elements 211 and 212 on opposite sides of the polarization rotating element 215 and a fiber loop 217 to bypass the polarization rotating element 215.

FIGS. 3a to 3d show various embodiments of the switching device according to the invention. In the embodiment 300 shown in FIGS. 3a,b switching functionality is increased by adding a second polarization rotating clement 307 into the optical loop. This allows switching of all signals to the ongoing port if polarization rotating element 316 is not activated or switching a signal passed through filters 318 and 319 and rotated by polarization rotating element 316 to the receiving port while all other signals are transmitted to the ongoing port. In the embodiment 330 shown in FIGS. 3c,d fiber loop 337 bypassing polarization rotating element 336 comprises a polarization rotator 338 allowing to switch all signals reflected at filtering elements 334 and 335 independently from signals having their polarization rotated by the polarization rotating element 336.

A requirement in many wavelength division optical communications systems is to exchange one or more of the wavelength channels on one fiber with the corresponding wavelength channels on another. Those wavelength channels that are not exchanged continue on their original fibers. This function is termed "transmultiplexing". It is also often necessary to drop signals from a wavelength set locally, or to replace arriving signals with locally generated signals.

Both transmultiplexing and local add-drop functions are normally carried out at the same location.

The conventional approach to add-drop and transmultiplex is to demultiplex all the signals, switch them as necessary with optical switches, and remultiplex the rerouted signals for onward tranmission. The usual way to do this employs a wavelength demultiplexer and a wavelength multiplexer for each fibre, with optical switches between them.

Figure 4A:
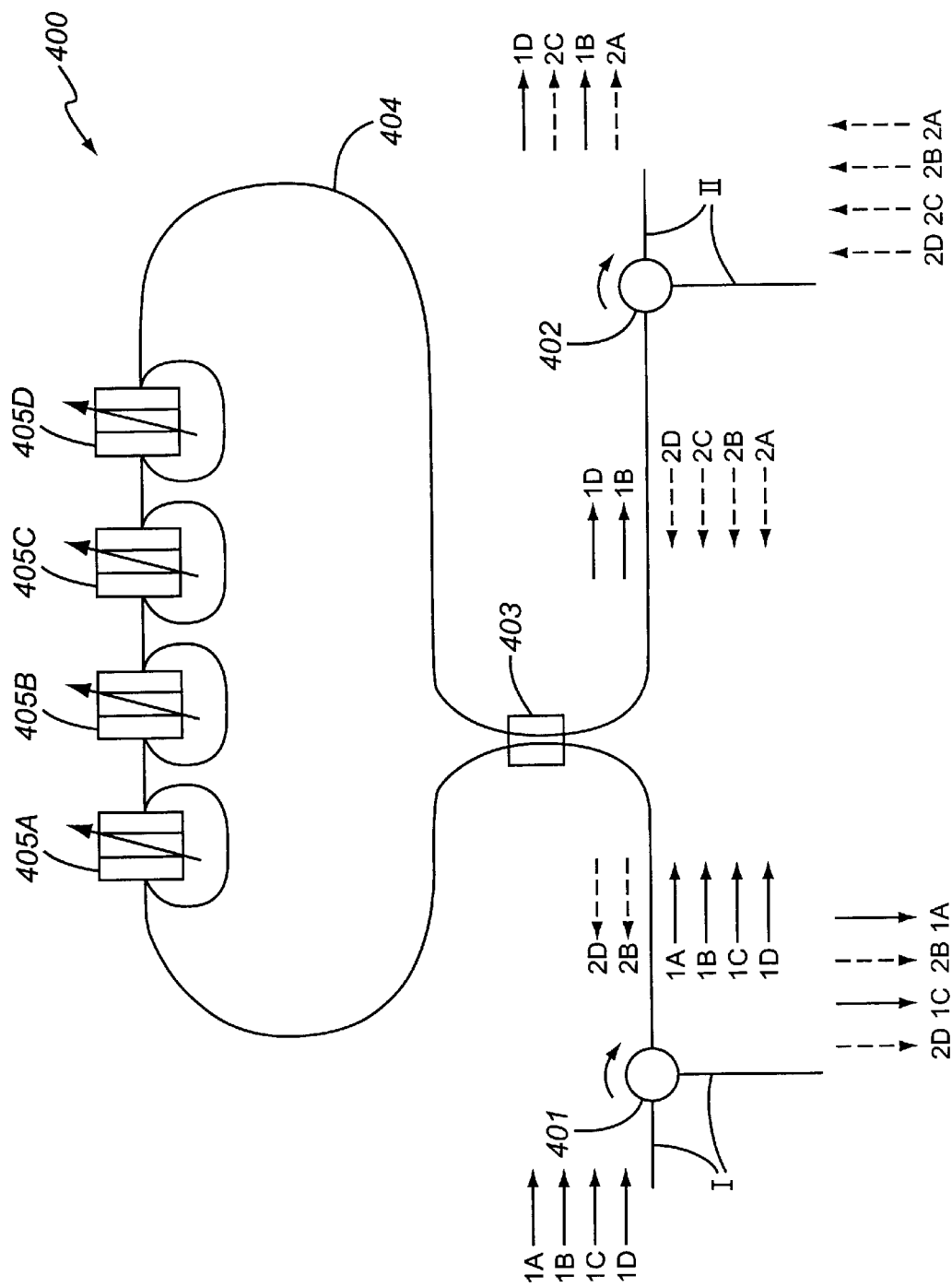
FIG. 4a is a schematic diagram of a transmultiplexer according to the invention comprising an optical loop.

Referring to FIG. 4a a transmultiplexer 400 to add-drop signals between channels 1A through 1D on fiber I and channels 2A through 2D on fiber II according to the invention is shown. An optical loop 404 is connected to the fibers I and II via coupler 403 and circulators 401, 402. The optical loop 404 comprises a plurality of switching elements, for example, four switching elements 405A, 405B, 405C, and 405D for four channels. As is obvious to a person of skill in the art, any number of switching elements may be interposed in the optical loop 404. Each switching element 405 comprises wavelength dependent filtering elements for passing a channel having a predetermined center wavelength and for reflecting channels having other center wavelengths, wherein the predetermined center wavelength differs from the predetermined center wavelength of the other switching elements.

The operation of the transmultiplexer 400 is as follows. If no switching element 405 is activated any light received from a circulator 401, 402 is reflected to the same circulator. Therefore, the signals in fibers I and II are unchanged. Referring to FIG. 4a a situation is depicted wherein switching elements 405B and 405D, affecting channels B and D, are activated. Signals 1B and 1D entering the optical loop 404 from circulator 401 are now transmitted to circulator 402 and are there routed into fiber II. Vice versa, signals 2B and 2D entering the optical loop 404 from circulator 402 are transmitted to circulator 401 and are there routed into fiber II. Signals in channels A and C have not been affected by the switching elements and, therefore, have been reflected to the same circulator. In consequence, channels B and D) are interchanged between the two fibers.

As is obvious to a person of skill in the art, this is a very elegant device for transmultiplexing allowing add-drop of signals between fibers without demultiplexing and remultiplexing.

Figure 4B:
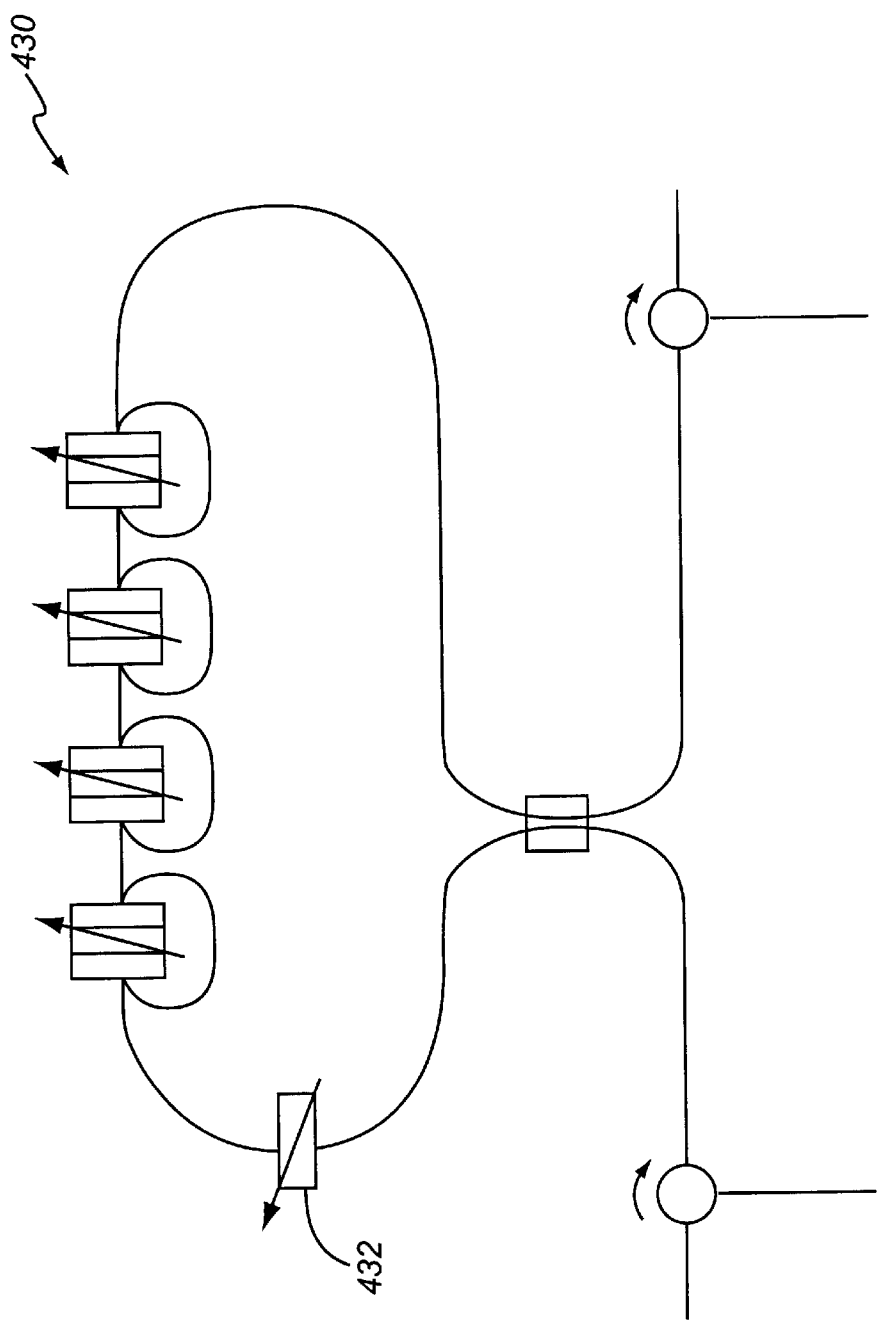
FIG. 4b is a schematic diagram of another embodiment of a transmultiplexer according to the invention comprising an optical loop.

Adding a polarization rotating element 432 into the optical loop as shown in FIG. 4b allows for the interchanging of channels un-affected by the switching elements between the two fibers I and II.

Figure 5:
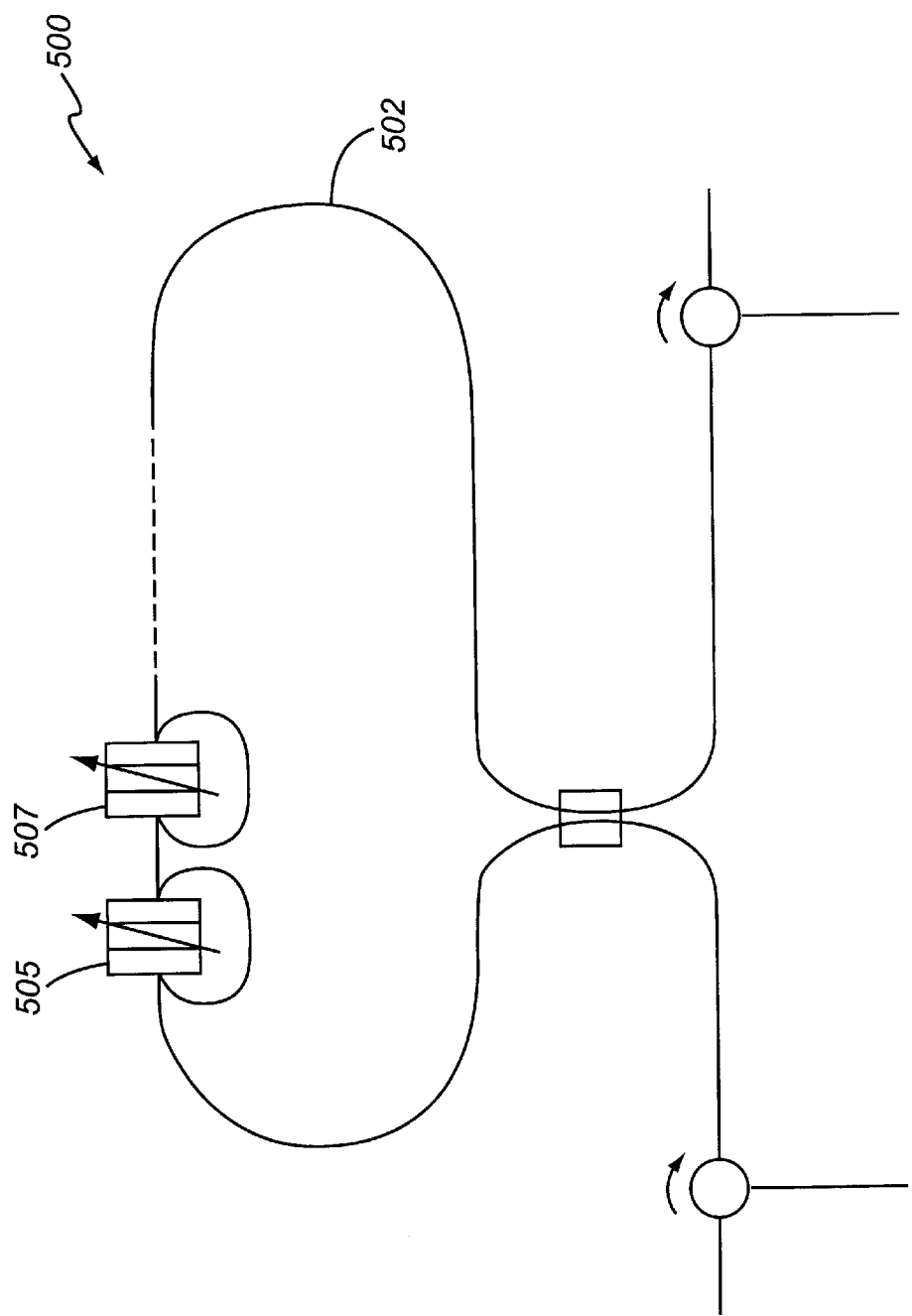

The simple and robust structure of this transmuliplexer and the control of the switching using an electric signal instead of an optical pump pulse facilitates numerous applications in modem optical communications networks, for example, the chaining of two or more transmultiplexers as shown in FIG. 4c. Replacing the filters in the switching elements with de-interleaver filters as shown in FIG. 5, provides more control as to which signals are routed where. For example, one switching clement 505 interposed in loop 502 having a de-interleaver filter for bypassing channels 1, 3, 5, 7 and for passing channels 2, 4, 6, 8 allows to route signals between two fibers in this manner. Adding switching element 507 having de-interleavers with a broader free spectral range in a binary relationship allows, for example, to pass channels 1 and 5 and re-route channels 3 and 7 of the channels 1, 3, 5, 7. As is obvious for a person of skill in the art, using a plurality of switching elements interposed within the loop wherein the switching elements comprise de-interleaver filter having free spectral ranges in a binary relationship provides numerous possibilities for routing signals between two fibers.

Of course, numerous other embodiments may be envisaged without departing from the spirit and scope of the claimed invention.

What is claimed is:

1. An optical switching device for controlling an optical signal comprising:

two ports disposed for optical communication therebetween for launching or receiving light;

a polarization rotating element interposed between the two ports for rotating the polarization of light incident thereon; and, a filtering element disposed to bypass the polarization rotating element or direct a signal propagating between the two ports through the polarization rotating element in dependence upon a property of the light.

2. An optical switching device as defined in claim 1, wherein the polarization rotating element comprises a Faraday rotator.

3. An optical switching device as defined by claim 1, wherein the property of the light is one of the wavelength or a shape of the pulse.

4. An optical switching device as defined in claim 1, wherein the filtering element comprises two filters disposed on opposite sides of the polarization rotating element.

5. An optical switching device as defined in claim 4, comprising a fiber loop connecting the two filters to bypass the polarization rotating element.

6. An optical switching device as defined in claim 5, wherein the fiber loop connecting the two filters comprises a polarization rotator.

7. An optical switching device as defined in claim 1, wherein the filtering element comprises a wavelength dependent filter.

8. An optical switching device for controlling an optical signal comprising:

an optical loop, the loop having two ports for launching or receiving light;

a switching element interposed within the loop for selectively routing light, the switching element comprising:

a polarization rotating element for rotating the polarization of light incident thereon; and, a filtering element disposed to bypass the polarization rotating element or direct a signal propagating within the loop through the polarization rotating element in dependence upon a property of the light.

9. An optical switching device as defined in claim 8, wherein the optical loop comprises a wave-guide loop.

10. An optical switching device as defined in claim 9, wherein the wave-guide loop comprises a polarization maintaining optical fiber.

11. An optical switching device as defined in claim 8, wherein the optical loop comprises a power splitting coupler for splitting a light beam into two portions, the two portions having a same light intensity.

12. An optical switching device as defined in claim 8, wherein the optical loop comprises a polarzation beam splitter for splitting a light beam into two portions.

13. An optical switching device as defined in claim 12, further comprising a rotator optically coupled with the polarization beam splitter.

14. An optical switching device as defined in claim 8, wherein the optical loop comprises means for deflecting a light beam propagating in free space.

15. An optical switching device as defined in claim 14, wherein the means for deflecting a light beam in free space comprises at least a mirror.

16. An optical switching device as defined in claim 8, wherein the optical loop comprises a second polarization rotating element.

17. An optical switching device as defined in claim 8, wherein the optical loop comprises a Sagnac interferometer.

18. An optical switching device as defined in claim 8, comprising a plurality of switching elements disposed within the optical loop.

19. An optical switching device as defined in claim 18, wherein each of the plurality of switching elements comprises a filtering element being transmissive for signals different than signals transmitted through filtering elements of the other switching elements of the plurality of switching elements.

20. An optical switching device as defined in claim 18, wherein the filter elements comprise de-interleaver filters disposed on opposite sides of the polarization rotating element and wherein the pairs of de-interleaver filters have free spectral ranges in a binary relationship.

21. A method for switching an optical signal comprising the steps of:
   receiving an optical input signal from one of two ports;
   rotating the polarization of the optical input signal using a polarization rotating element interposed between the two ports; and,
   by passing the polarization rotating element or directing a signal propagating between the two ports through the polarization rotating element in dependence upon a property of the light by filtering said signal.

22. A method for switching an optical signal as defined in claim 21, wherein the polarization of the optical signal is rotated 90 degrees.

23. A method for switching an optical signal as defined in claim 21, wherein the polarization rotating element comprises a Faraday rotator.

24. A method for switching an optical signal as defined in claim 23, wherein the polarization is rotated 90 degrees by applying an electric current to the Faraday rotator such that the laraday rotator operates in saturation.

25. An optical switch for interchanging optical signals between two optical fibers comprising:
   an optical loop, the loop having two ports wherein each port is connected to one of the two optical fibers for launching or receiving light;
   at least a switching element interposed within the loop for selectively routing light, the switching element comprising:
      a polarization rotating element for rotating the polarization of light incident thereon; and,
      a filtering element disposed to bypass the polarization rotating element or direct a signal propagating within the loop through the polarization rotating element in dependence upon a property of the light.

* * * * *